(12) United States Patent
Lin et al.

(10) Patent No.: US 12,417,391 B2
(45) Date of Patent: Sep. 16, 2025

(54) MODULAR ADAPTATION FOR CROSS-DOMAIN FEW-SHOT LEARNING

(71) Applicant: SRI International, Menlo Park, CA (US)

(72) Inventors: Xiao Lin, Union City, CA (US); Meng Ye, Lawrenceville, NJ (US); Yunye Gong, West Windsor, NJ (US); Giedrius T. Burachas, Doylestown, PA (US); Ajay Divakaran, Monmouth Junction, NJ (US); Yi Yao, Princeton, NJ (US); Nikoletta Basiou, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 724 days.

(21) Appl. No.: 17/844,701

(22) Filed: Jun. 20, 2022

(65) Prior Publication Data
US 2022/0414476 A1    Dec. 29, 2022

Related U.S. Application Data

(60) Provisional application No. 63/214,128, filed on Jun. 23, 2021.

(51) Int. Cl.
| | | |
|---|---|---|
| *G06F 18/21* | (2023.01) | |
| *G06F 18/211* | (2023.01) | |
| *G06F 18/24* | (2023.01) | |
| *G06N 3/04* | (2023.01) | |
| *G06N 3/047* | (2023.01) | |
| *G06N 3/088* | (2023.01) | |
| *G06N 5/01* | (2023.01) | |
| *G06N 20/00* | (2019.01) | |

(52) U.S. Cl.
CPC .......... *G06N 3/088* (2013.01); *G06F 18/211* (2023.01); *G06N 3/047* (2023.01)

(58) Field of Classification Search
CPC ...... G06N 3/088; G06N 3/047; G06N 3/0895; G06N 5/01; G06N 20/00; G06F 18/211; G06F 18/2185; G06F 18/24143
See application file for complete search history.

(56) References Cited

PUBLICATIONS

Chen, et al., A simple framework for contrastive learning of visual representations. In ICML, pp. 1597-1607. PMLR, 2020.
(Continued)

*Primary Examiner* — Joseph P Hirl
(74) *Attorney, Agent, or Firm* — MOSER TABOADA

(57) ABSTRACT

A method, apparatus and system for adapting a pre-trained network for application to a different dataset includes arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off, determining at least one respective hyperparameter for each of the at least two different types of active adaptation modules, and applying the at least one respective determined hyperparameter to each of the at least two different types of active adaptation modules for processing received data from the pretrained network to determine an adapted network.

20 Claims, 8 Drawing Sheets

(56) References Cited

PUBLICATIONS

Finn, et al., Model-agnostic meta-learning for fast adaptation of deep networks. In *International Conference on Machine Learning*, p. 1126-1135. PMLR, 2017.

Guo, et al., Spottune: transfer learning through adaptive fine-tuning. In *CVRP*, 2019, pp. 1-10.

Helber, et al., Eurosat: A novel dataset and deep learning benchmark for land use and land cover classification. IEEE Journal of Selected Topics in Applied Earth Observations and Remote Sensing. 12(7): 2217-2226, 2019.

Li, et al., Rethinking the hyperparameters for fine-tuning. ICLR, 2020, pp. 1-20.

Li, et al., Explicit inductive bias for transfer learning with convolutional networks. ICML, 2018, 12 pages.

Liu, et al., Learning to propagate labels: Transductive propagation network for few-shot learning. ICLR, 2019, pp. 1-14.

Perrone, et al., Scalable hyperparameter transfer learning. In NeurIPS, pp. 6846-6856, 2018.

Zammir, et al., Disentangling task transfer learning. In Proceedings of the IEEE, conference on computer vision and pattern recognition, pp. 3712-3722, 2018.

Zhai, et al., The visual task adaptation benchmark. 2019, 33 pages.

Zoph, et al., Neural architecture search with reinforcement learning. ICLR, 2017, pp. 1-16.

Hu, et al., Leveraging the feature distribution in transfer-based few-shot learning. arXiv preprint arXiv: 2006.03806, 2020.

Mangla, et al., Charting the right manifold: Manifold mixup for few-shot learning. In WAVC, pp. 2218-2227, 2020.

Qiao, et al., Few-shot image recognition by predicting parameters from activations. In CVPR, 2018, 10 pages.

Tseng, et al., Cross-domain few-shot classification via learned feature-wise transformation. In ICLR, 2020, pp. 1-18.

| Approach | DomainNet 100-way 2-shot adaption | | | | | | |
| --- | --- | --- | --- | --- | --- | --- | --- |
| | Real | Clipart | Sketch | QDraw | Infgrph | Pnting | Overall |
| PN | 66.68 | 35.60 | 21.59 | 21.37 | 8.35 | 36.89 | 31.75 |
| FT | 57.02 | 35.54 | 22.68 | 32.88 | 8.61 | 34.22 | 31.66 |
| Full | 69.25 | 39.25 | 27.38 | 30.10 | 9.91 | 39.66 | 35.93 |

| Approach | DomainNet 100-way 5-shot adaption | | | | | | |
| --- | --- | --- | --- | --- | --- | --- | --- |
| | Real | Clipart | Sketch | QDraw | Infgrph | Pnting | Overall |
| PN | 72.39 | 48.09 | 31.82 | 30.51 | 12.72 | 45.72 | 40.21 |
| FT | 71.26 | 54.05 | 39.02 | 47.29 | 14.26 | 50.42 | 46.05 |
| Full | 74.94 | 59.21 | 43.23 | 45.73 | 16.49 | 55.21 | 49.14 |

| Approach | DomainNet 100-way 10-shot adaption | | | | | | |
| --- | --- | --- | --- | --- | --- | --- | --- |
| | Real | Clipart | Sketch | QDraw | Infgrph | Pnting | Overall |
| PN | 75.50 | 54.99 | 40.85 | 35.23 | 16.75 | 51.44 | 45.79 |
| FT | 77.05 | 65.98 | 48.88 | 58.14 | 20.00 | 58.22 | 54.71 |
| Full | 77.66 | 68.45 | 49.74 | 55.33 | 23.64 | 59.70 | 55.75 |

| Approach | DomainNet 100-way 20-shot adaption | | | | | | |
| --- | --- | --- | --- | --- | --- | --- | --- |
| | Real | Clipart | Sketch | QDraw | Infgrph | Pnting | Overall |
| PN | 77.91 | 60.77 | 44.60 | 39.62 | 21.36 | 56.48 | 50.12 |
| FT | 80.61 | 72.96 | 56.58 | 66.04 | 26.89 | 64.97 | 61.34 |
| Full | 79.93 | 75.23 | 55.65 | 62.89 | 30.28 | 65.25 | 61.54 |

FIG. 4

| Overall accuracy | DomainNet Overall accuracy using different hyperparameters ||||||||||||
| | From scratch |||| Transfer |||| Oracle ||||
| | Full | FT | PN | Full vs FT/PN | Full | FT | PN | Full vs FT/PN | Full | FT | PN | Full vs FT/PN |
|---|---|---|---|---|---|---|---|---|---|---|---|---|
| 2 | 36.15 | 31.36 | 31.81 | +4.34 | 35.93 | 31.66 | 31.75 | +4.18 | 36.34 | 30.74 | 32.30 | +4.04 |
| 5 | 47.70 | 44.14 | 40.77 | +3.56 | 49.14 | 46.05 | 40.21 | +3.09 | 49.00 | 46.28 | 41.06 | +2.72 |
| 10 | 55.84 | 54.14 | 46.61 | +1.70 | 55.75 | 54.71 | 45.79 | +1.04 | 55.92 | 55.07 | 46.61 | +0.85 |
| 20 | 61.30 | 61.22 | 50.34 | +0.08 | 61.54 | 61.34 | 50.12 | +0.20 | — | — | — | — |

FIG. 5

MODULAR ADAPTATION FOR CROSS-DOMAIN FEW-SHOT LEARNING

CROSS-REFERENCE TO RELATED APPLICATIONS

This application claims benefit of and priority to U.S. Provisional Patent Application Ser. No. 63/214,128, filed Jun. 23, 2021, which is herein incorporated by reference in its entirety.

GOVERNMENT RIGHTS

This invention was made with Government support under Contract Number FA8750-19-C-0511 awarded by the Air Force Research Laboratory. The Government has certain rights in this invention.

FIELD

Embodiments of the present principles generally relate to a method, apparatus and system for modular adaptation for cross-domain few-shot learning and, more particularly, to a method, apparatus and system for adapting pre-trained representations to different datasets by concatenating adaptation modules and pre-selecting hyperparameters.

BACKGROUND

In few-shot learning, the task of building classifiers using limited examples by adapting high-quality pre-trained representations has demonstrated successful applications in computer vision and natural language processing. Fine-tuning pre-trained networks and learning classifiers on top of these pre-trained embeddings leads to highly accurate classifiers built from few training examples. An ideal pre-trained representation can include one that is learned in domains relevant to the target task or sufficiently diverse to enable effective transfer. In practice however, relevant data for learning is scarce and there is often a certain degree of domain shifts between the pretext and the downstream task, where label ontology, viewpoint, image style, or input modality may differ. As such, cross-domain few-shot learning—few-shot learning with domain shifts between pretext and downstream tasks—recently brings renewed interest to this classical transfer learning problem focusing on the low data regime.

Existing studies show that depending on the characteristics of underlying domain shifts, different downstream tasks may favor different adaptation methods, either straightforward fine tuning-based or more advanced metric learning-based few-shot approaches. The degree of fine-tuning required may also depend on the amount of training data available in the target domain. For example, methods specialized in localizing objects may be effective on certain datasets but not on some others. As a result, developing a one-size-fits-all cross-domain few-shot learning approach has been challenging, if not entirely infeasible.

SUMMARY

Embodiments of methods, apparatuses and systems for adapting pre-trained representations to different datasets using cross-domain modular adaptation are disclosed herein.

In some embodiments, a method for adapting pre-trained representations to different datasets includes arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off, determining at least one respective hyperparameter for each of the at least two different types of active adaptation modules, and applying the at least one respective determined hyperparameter to each of the at least two different types of active adaptation modules for processing received data from the pretrained network to determine an adapted network.

In some embodiments, an apparatus for adapting pre-trained representations to different datasets includes a non-transitory machine-readable medium having stored thereon at least one program. In some embodiments, the at least one program includes instructions which, when executed by a processor, cause the processor to perform a method in a processor based system for adapting a pre-trained network for application to a different dataset, including arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off, determining at least one respective hyperparameter for each of the at least two different types of active adaptation modules, and applying the at least one respective determined hyperparameter to each of the at least two different types of active adaptation modules for processing received data from the pretrained network to determine an adapted network.

In some embodiments, a system for adapting a pre-trained network for application to a different dataset, includes a storage device, and a computing device comprising a processor and a memory having stored therein at least one program. In some embodiments the at least one program includes instructions which, when executed by the processor, cause the computing device to perform a method including arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off, determining at least one respective hyperparameter for each of the at least two different types of active adaptation modules, and applying the at least one respective determined hyperparameter to each of the at least two different types of active adaptation modules for processing received data from the pretrained network to determine an adapted network.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 4 depicts a Table of results of the comparison of a MAP of the present principles against PN and FT only pipelines and using a hyperparameter search in accordance with an embodiment of the present principles.

FIG. 5 depicts a Table of the results of a comparison of hyperparameter selection strategies for a MAP of the present principles against PN and FT only pipelines at 2, 5, 10, and 20 shots by their average accuracy across all datasets in accordance with an embodiment of the present principles.

Figure 1:
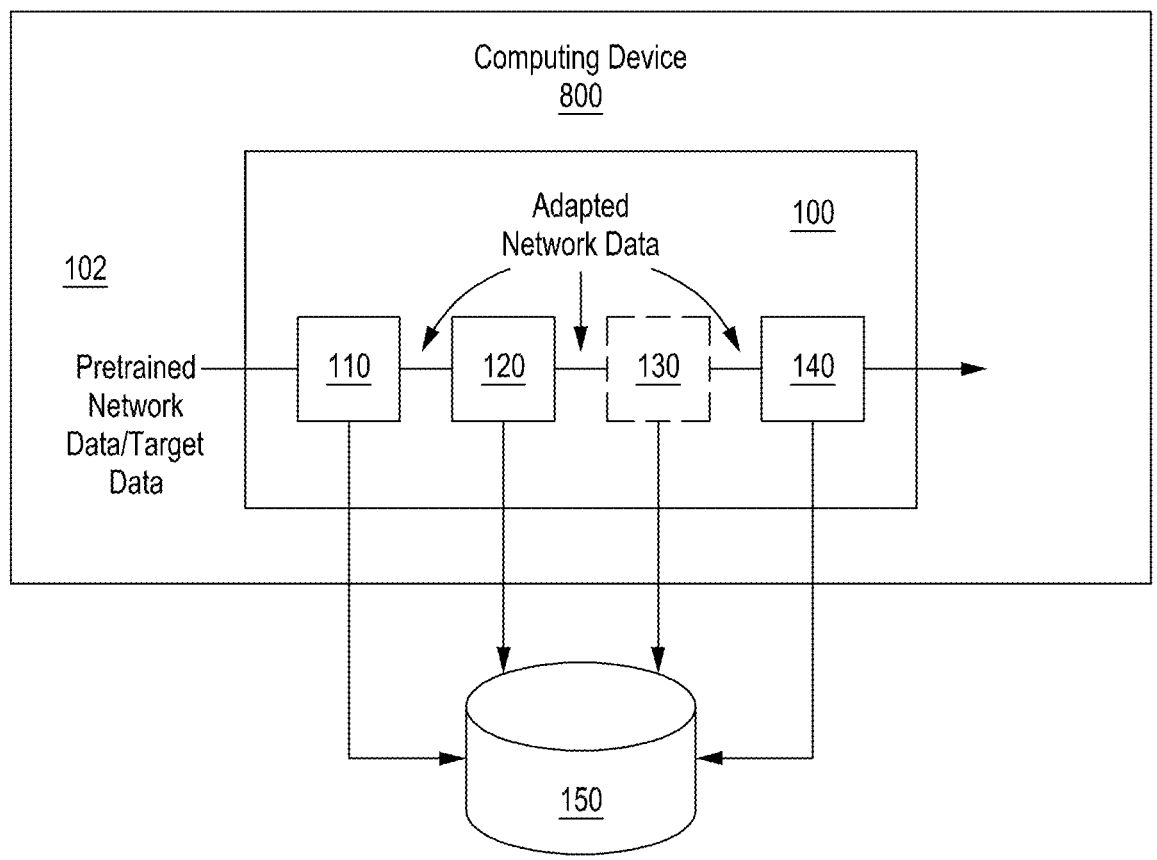
FIG. 1 depicts a high-level block diagram of a cross-domain modular adaptation system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for adapting pre-trained networks to different datasets using cross-domain modular adaptation. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to particular numbers of adaptation modules arranged in specific orders, such teachings should not be considered limiting. Embodiments in accordance with the present principles can function with substantially any numbers of adaptation modules arranged in substantially any order.

In accordance with the present principles, chaining multiple modules corresponds to adapting a pretrained network using a pipeline of adaptation approaches sequentially. Embodiments of the present principles provide "pipelined" adaptation methods and configurations which the inventors refer to as Modular Adaptation Pipelines (MAPs). The various adaptation approaches will be referred to adaptation modules in the description herein for clarity.

FIG. 1 depicts a high-level block diagram of a cross-domain modular adaptation pipeline (MAP) system 100 in accordance with an embodiment of the present principles. The cross-domain MAP system 100 of FIG. 1 illustratively comprises an adaptation type selection module 110, a hyperparameter selection module 120, an optional adaptive learning module 130, an optional evaluation module 140 and a storage device 150.

As further depicted in FIG. 1, embodiments of a cross-domain MAP system of the present principles, such as the cross-domain MAP system 100 of FIG. 1, can be implemented via a computing device 700 in accordance with the present principles (described in greater detail below). Although in FIG. 1, the storage device 150 is depicted as comprising a separate component from the cross-domain MAP system 100 and the computing device 700, in some embodiments of the present principles, the storage device 150 can comprise a storage device that comprises a component of at least one of the cross-domain MAP system 100 and/or the computing device 700.

Figure 2:
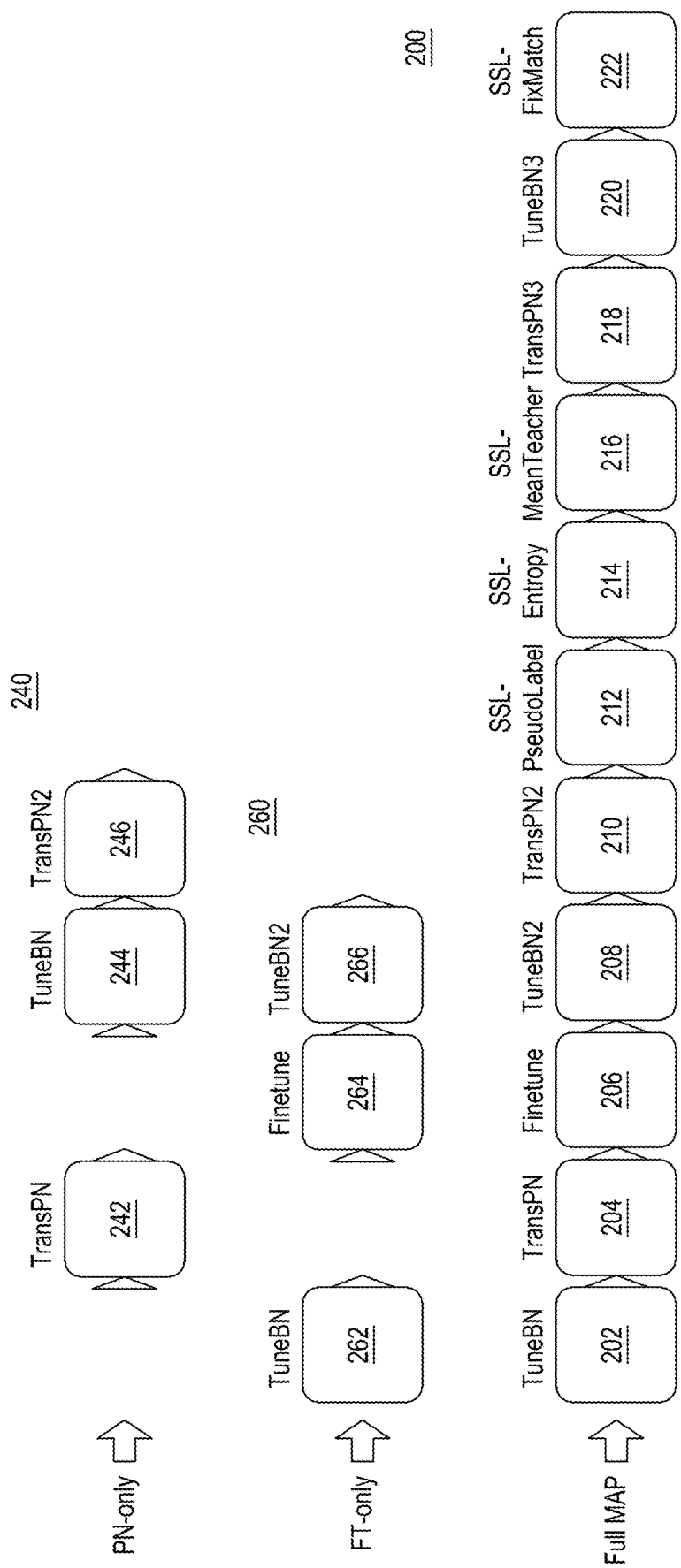
FIG. 2 depicts a graphical representation of a pipeline of qualitatively different adaptation modules of a cross-domain MAP system of the preset principles such as the cross-domain MAP system in accordance with an embodiment of the present principles.
Figure 3:
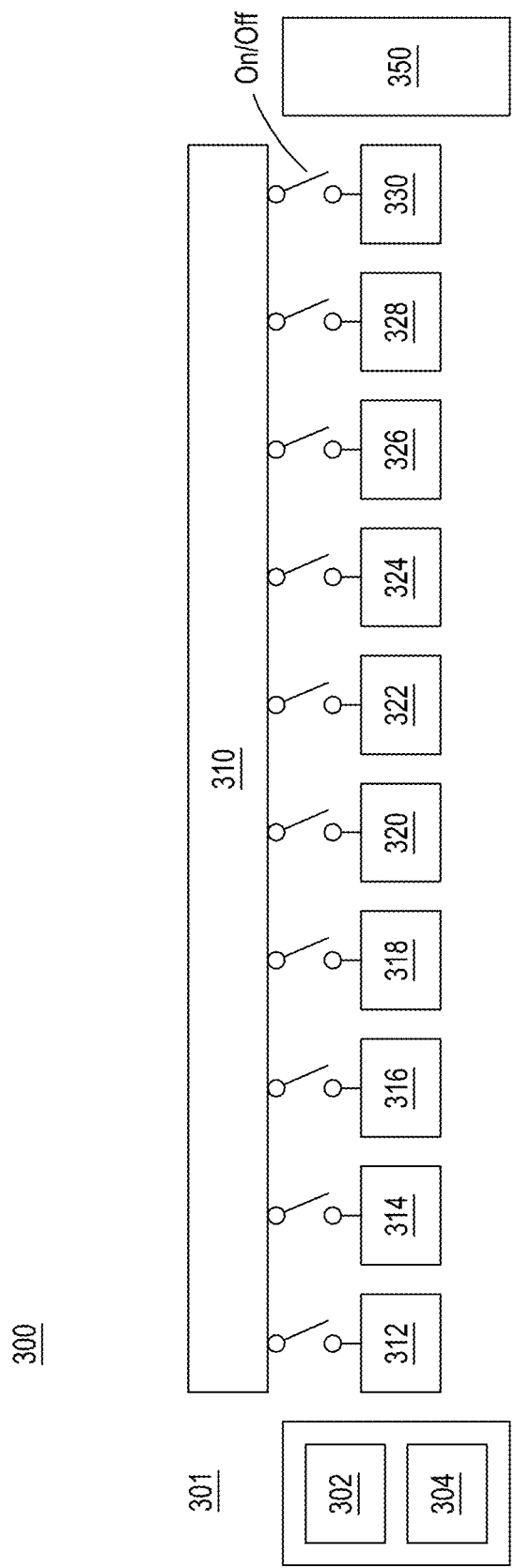
FIG. 3 depicts a functional diagram of a cross-domain MAP system of the present principles, such as the cross-domain MAP system of FIG. 1, implementing an optional adaptive learning module in an iterative process in accordance with an embodiment of the present principles.

In some embodiments and as depicted in FIG. 1, the cross-domain MAP system 100 of FIG. 1 can receive as an input a dataset classifier/trained network model 102 (further depicted in FIG. 3 as 302). A goal of a cross-domain MAP system of the present principles, such as the cross-domain MAP system 100 of FIG. 1, is to adapt the input classifier/trained network model 102 to be applicable to a new dataset. In the cross-domain MAP system 100 of FIG. 1, the adaptation module type selection module 110 can initially select a collection of adaptation modules to arrange in a pipeline for adapting the input classifier/trained network model 102 to an intended dataset, which is known to the cross-domain MAP system 100 of FIG. 1. In some embodiments, the adaptation modules can be stored in the storage device 150 of the cross-domain MAP system 100 of FIG. 1. Alternatively or in addition, storage in accordance with the present principles can be located on another device or in the cloud. In some embodiments, the adaptation module type selection module 110 determines which adaptation module types to include and/or activate in a pipeline of the present principles (described in greater detail with reference to FIG. 2), based on a user input to, for example, the computing device 700. Alternatively or in addition, the adaptation module type selection module 110 determines which adaptation module types to include and/or activate in a pipeline of the present principles (described in greater detail with reference to FIG. 2), based on input from a machine learning process (described in greater detail below).

In some embodiments, the adaptation modules pipelined in a cross-domain MAP system of the present principles can include at least two or more qualitatively different adaptation module types, which can be selected by the adaptation module type selection module 110. In such embodiments, the adaptation module types can include, but are not limited to, a Finetuning module, a Prototypical networks module, a BatchNorm statistics tuning module, a Semi-supervised learning module with pseudo labels, a Semi-supervised learning module with entropy maximization, a Semi-supervised learning module with student-teacher, and a Semi-supervised learning module with a FixMatch. Semisupervised learning approach. In a pipeline of the present principles, a finetuning module can be selected to finetune both the embedding and the classifier/trained network model for a number of epochs. Options of the finetuning module include, but are not limited to, replacing the classification network, C, with a new fully connected layer; a choice of optimizer Adam/SGD; a learning rate, momentum, weight decay; data augmentation; batch size, number of epochs; and epochs for learning rate stepping. A Prototypical Networks module with semi-supervised embedding propagation can be selected to implement prototypical networks with embedding power scaling and Calibrated Iterative Prototype Adaptation semi-supervised embedding propagation using unlabeled data, which is specialized in few-shot learning. In some embodiments, the embedding network will remain the same, whereas the classifier can be replaced with scaled cosine similarity to the prototypes of each class. Options of the Prototypical Networks module include, but are not limited to, multiplier on cosine similarity; embedding power scaling factor; CIPA weight and number of rounds. A BatchNorm statistics tuning module can be selected to keep weights fixed. The BatchNorm statistics tuning module is able to run unlabeled data in the new domain through the network to enable all batchnorm layers to accumulate statistics and is specialized in domain-adaptation. Options of the BatchNorm statistics tuning module include, but are not limited to, setting batchnorm momentum before and after statistics accumulation; batch size, and number of iterations.

In a pipeline of the present principles, a semi-supervised learning module with pseudo labels which includes a standard, semi-supervised learning approach can be selected. The semi-supervised learning module is implemented to predict pseudo labels on unlabeled data and to use labeled examples as well as unlabeled examples with pseudo labels for finetuning. A semi-supervised learning module with entropy maximization can be selected which implements a standard semi-supervised learning approach and is able to finetune the network with an additional term to minimize entropy of predicted label distribution on unlabeled data. A semi-supervised learning module with student-teacher can be selected for a pipeline of the present principles, which implements a slow-moving teacher network to teach a fast-moving student network. In addition, A semi-supervised learning module with a FixMatch. Semisupervised learning approach can be selected which introduces consistency between strong and weak augmentations under a pseudo-label framework. It should be noted that, in accordance with the present principles, the above described adaptation module types are not intended to be an exhaustive list of adaptations modules able to be implemented in a cross-domain MAP system of the present principles. In accordance with the present principles, a cross-domain MAP system can implement any adaptation module types currently known or yet unknown in accordance with the present principles described herein.

In some embodiment of the present principles, an adaptation module type selection module of a cross-domain MAP system of the preset principles such as the adaptation module type selection module 110 of the cross-domain MAP system 100 of FIG. 1, can select adaptation modules to include in a pipeline of the present principles based on a historical performance of a respective adaptation module type with respect to a target dataset. For example, in some embodiments in which a target dataset is known, the adaptation module type selection module 110 can refer to data, which in some embodiments can be stored in the storage device 150, that provides information as to how an adaptation module type performs on data of the known target dataset. If an adaptation module type performed well in the past with respect to the known target dataset, that adaptation module type can be included in a pipeline for the known target dataset. Further information regarding how an adaptation module type performed alongside or with other adaptation module types in a pipeline for the known target dataset can be included in making selections of what type of adaptation modules should be included in a pipeline of the present principles for a known target dataset. Alternatively or in addition, further information regarding a performance of an adaptation module type in specific location of a pipeline and along side or with other adaptation module types in the pipeline can be included in making selections of what type of adaptation modules should be included in a pipeline of the present principles for a known target dataset.

In some embodiments of the present principles, an adaptation module type selection module of a cross-domain MAP system of the preset principles such as the adaptation module type selection module 110 of the cross-domain MAP system 100 of FIG. 1, can receive an input from a user via, for example an input device 750 of the computing device 700, to select adaptation module types to include in a pipeline of the present principles. Alternatively or in addition, in some embodiments the adaptation module 110 can implement a machine learning process (described in greater detail below) to select adaptation module types to include in a pipeline of the present principles.

FIG. 2 depicts a graphical representation of a pipeline 200 of qualitatively different adaptation module type that can be selected and arranged by an adaptation module type selection module of a cross-domain MAP system of the preset principles such as the cross-domain MAP system 100 of FIG. 1 in accordance with an embodiment of the present principles. As depicted in FIG. 2, the pipeline 200 includes at least two of the different types of adaptation modules described above. The cross-domain MAP system of FIG. 2 illustratively comprises a pipeline 200 of 11 modules, in which a finetuning module 202 is followed by a semi-supervised learning module 222 with tuning, batchnorm, and protonet modules 204-220 in-between. In the embodiment of the cross-domain MAP system of FIG. 2, each module can be switched on or off by, for example the adaptation module type selection module 110. When switched off, a module will be replaced with a skip connection, F'=F. In accordance with the present principles, in some embodiments, copies of a same type adaptation module can be provided in a pipeline of the present principles, such as the pipeline 200 of FIG. 2, such that modules of a same type can be turned on or off in the pipeline to determine a better or best location of the adaptation module type in the pipeline. As illustrated in the embodiment of the cross-domain MAP system of FIG. 2, the search space covers standard baseline approaches such as batchnorm+protonet and batchnorm+finetuning. The MAP search space of the embodiment of FIG. 2 consists of switches $\{0,1\}^n$ and the hyperparameters for each module.

FIG. 2 further depicts a pipeline 240 including only two protonet modules 242, 244 and one batchnorm module 246 and another pipeline 260 including only one finetuning module 262 and two batchnorm modules 264, 266, to demonstrate the advantages of the full MAP pipeline 200 of the present principles (described in greater detail below).

Referring back to FIG. 1, the hyperparameter selection module 120 can be used to select hyperparameters for each of the implemented adaptation modules of a pipeline, such as the pipeline 200 of FIG. 2, for a cross-domain MAP system of the present principles, such as the cross-domain MAP system 100 of FIG. 1. As referred to herein, a hyperparameter of, for example, an adaptation module type includes a manually set variables which determines the structure (e.g., learning rate, regularization constant, number of branches in a decision tree, etc.) of an adaptation module. In some embodiments of the present principles, the hyperparameter selection module 120 can select hyperparameters from a collection of hyperparameters stored in the storage device 150. In some embodiments, the hyperparameter selection module 120 determines which hyperparameters to apply for each of the adaptation module types to include and/or activate in the pipeline 200 of the present principles, based on a user input to, for example, the computing device 700. Alternatively or in addition, the hyperparameter selection module 120 determines which hyperparameters to apply to each of adaptation module types in the pipeline 200 of the present principles, based on input from a machine learning process (described in greater detail below).

In some embodiments, a hyperparameter search space for a cross-domain MAP system of the present principles is designed to be fixed-dimensional to remain compatible with standard Bayesian hyperparameter search techniques. Combining multiple qualitatively different adaptation modules in a cross-domain MAP system in accordance with the present principles provides a simple yet effective way to expand the search space of adaptation approaches for improved performance. Given several datasets, an optimal cross-domain MAP system of the present principles can be automatically searched through hyperparameter search within a MAP search space. In some embodiments of the present principles, hyperparameters, in transfer learning, are finetuned dependent upon a final dataset. In some embodiments of the present principles, to fully leverage the potential of a cross-domain MAP system, hyperparameters are configured through cross validation.

As described above, embodiments of the present principles provide methods, apparatuses, and systems for adapting a pretrained classifier/network model to perform image classification on, for example, a different dataset in a new domain. For example, given 1) a pretrained image classifier, F, consisting of an embedding network, E, and a classifier, C, which takes in an image, I, and can output scores of classes, $s=F(I)=C(E(I))$, 2) a small N-way, K-shot labeled training set and 3) a set of unlabeled images of a classification problem in the domain of interest, in some embodiments of the present principles, the task is to build an image classifier, F', in the new domain to predict labels on a new/test dataset. At the meta level, adaptation approaches can be abstracted into a module, $F'=M(F, D, D_{ul})$ or equivalently in operator form, $F'=M(D, D_{ul})[F]$. In accordance with the present principles, multiple modules can be chained and result in a valid adaptation approach in accordance with equation one (1), which follows:

$$F'=M_1(D, D_{ul}) \circ M_2(D, D_{ul})[F] \triangleq M(D, D_{ul})[F]. \quad (1)$$

In accordance with the present principles, given D, $D_{ul}$, the goal is to obtain a good set of hyperparameters for configuring a cross-domain MAP system of the present principles, such as the pipeline 200 for the cross-domain MAP system of FIG. 2. The standard approach in the art is to apply a hyperparameter search to optimize cross-validation performance on D. This approach leverages the empirical observation that an optimal hyperparameter tends to be robust to small dataset size multipliers. For finetuning, a small grid search is performed on a learning rate and the number of epochs is determined through early stoppage. A cross-domain MAP system of the present principles, however, depends on many more hyperparameters. Typically a few hundred Bayesian hyperparameter optimization steps are needed to obtain a good set of hyperparameters and computation time optimization becomes relevant.

In accordance with the present principles, instead of performing cross-validation hyperparameter searches from scratch, the hyperparameter selection module 120 of the cross-domain MAP system 100 of FIG. 1 can perform a search bootstrapped from a diverse set of existing high-performance hyperparameters from known domains to reduce the running time. In some embodiments, to collect a set of diverse hyperparameters, a set of initial hyperparameters can be extracted on randomly sampled N-way K-shot subsets from a collection of common vision datasets through hyperparameter search. Then the diversity of the hyperparameters is then selected by looking at their performance ranking across multiple N-way, K-shot subsets. Specifically, in some embodiments for each N-way, K-shot subset having been sampled, the performance ranking of the set of hyperparameters can be computed as the embedding of the subset. Subsets that have embeddings with high rank correlation favor similar MAPs. As such, a MAP searched on one subset would, in general, apply well to subsets that have similar embeddings. Finally, to obtain a set of diverse MAPs, M subsets are selected that have the optimal rank correlation coverage over all embeddings.

Some embodiments of the present principles include an iterative process in which adaptation modules in a cross-domain MAP system are selectively turned on and off and different hyperparameters are selected for adaptation modules for various pass-throughs to attempt to determine a combination of adaptation modules and hyperparameters that produce a good/better or best result for an adapted network for a new dataset. For example, FIG. 3 depicts a functional diagram 300 of a cross-domain MAP system of the present principles, such as the cross-domain MAP system 100 of FIG. 1, implementing the optional adaptive learning module 130 in an iterative process in accordance with an embodiment of the present principles. In the functional diagram 300 of the embodiment of the cross-domain MAP system of the present principles of FIG. 3, in a first passthrough of the iterative process, an input to the cross-domain MAP system includes a pretrained network 301 and specifically information regarding a pretrained classifier 302 and an associated embedding space 304 of the pretrained network 301. In the functional diagram 300 of the cross-domain MAP system, a MAP selection and adaptation control system 310, can comprise, for example, an adaptation type selection module, a hyperparameter selection module, and an adaptive learning module of the present principles (not shown). For example, as described above with reference to FIG. 1 and FIG. 2, the adaptation type selection module 110 of the present principles selects adaptation module types to arrange in a pipeline and the hyperparameter selection module 120 of the present principles determines hyperparameters to apply to selected adaptation module types that are switched on in the pipeline based on at least one of user inputs, historical performance of adaptation modules and hyperparameters, or machine learning processes, as described herein.

More specifically, in some embodiments at least one module of the present principles can determine which adaptation modules/adaptation module types and/or hyperparameters to include in a pipeline of the present principles using historical information regarding which adaptation modules/adaptation module types and/or hyperparameters work well for determining an adapted network for the target dataset. In some embodiments, such information can be stored in a storage device accessible by at least a selection module of the present principles. Alternatively or in addition, in some embodiments, information regarding which adaptation modules/adaptation module types and/or hyperparameters work well in a pipeline of the present principles for determining an adapted network for the known, target dataset can be input to a cross-domain MAP system of the present principles, such as the cross-domain MAP system 100 of FIG. 1, using an input device of a computing system in communication with a cross-domain MAP system of the present principles, such as the computing device 700 depicted in FIGS. 1 and 7. Alternatively or in addition, in some embodiments, at least one of a selection module of the present principles can implement a machine learning process to determine information regarding which adaptation modules/adaptation module types and/or hyperparameters work well in a pipeline of the present principles for determining an adapted network for a target dataset. That is, in some embodiments, a machine learning process can be trained to recognize which adaptation modules/adaptation module types and/or hyperparameters work well in a pipeline of the present principles for determining an adapted network for the target dataset. That is, in some embodiments, the active adaptation modules/adaptation module types or the respective hyperparameters for a pipeline of the present principles are selected from a collection of historically well-functioning adaptation modules or hyperparameters that can be stored in a storage device (described in greater detail below with reference to specific embodiments applied to adaptation modules and hyperparameters, respectively). The term well-functioning, in at least some embodiments, intended to describe an instance in which the application of a well-functioning adaptation module/adaptation module type and/or a well-functioning hyperparameter to a pipeline of the present principles, results in an adapted network that, when applied to a target dataset, produces desirable results, such as effectively identifying patterns in the dataset and/or identifying specific data in the dataset.

In the functional diagram 300 of the cross-domain MAP system of FIG. 3, a pipeline 305 of the present principles illustratively includes a first BatchNorm statistics tuning module 312, a first Prototypical Network module 314, a finetuning module 316, a second BatchNorm statistics tuning module 318, a second Prototypical Network module 320, a semi-supervised learning module with student-teacher 322, a semi-supervised learning module with entropy maximization 324, a third BatchNorm statistics tuning module 326, a third Prototypical Network module 328, and an adaptive learning module 330. Although in the embodiment of FIG. 3, the pipeline 305 comprises specific adaptation modules, in alternate embodiments of the present principles the pipeline can comprise other adaptation modules not specifically depicted.

As depicted in FIG. 3, the MAP selection and adaptation control system 310 can switch on or off any of the adaptation modules 312-328, and/or the adaptive learning module 330. In some embodiments in which a target dataset is known, in a first iteration, the adaptation control system 310 can determine which adaptation modules to turn on or off using historical information regarding which adaptation modules work well for determining an adapted network for the target dataset (as described above). In some embodiments, such information can be stored in the storage device 150 and can be accessed by at least a hyperparameter selection module and/or the adaptation control system 310 of the present principles. Alternatively or in addition, in some embodiments, information regarding which adaptation modules work well with a known, target dataset can be input to a cross-domain MAP system of the present principles, such as the cross-domain MAP system 100 of FIG. 1, using an input device of a computing system in communication with a cross-domain MAP system of the present principles, such as the computing device 700 depicted in FIGS. 1 and 7. Alternatively or in addition, in some embodiments, at least one of an adaptation type selection module of the present principles, such as the adaptation type selection module 110 of FIG. 1 and/or an adaptation control system of the present principles, such as the adaptation control system 310 of FIG. 3, can implement a machine learning process to determine information regarding which adaptation modules work well with a known, target dataset. That is, in some embodiments, a machine learning process can be trained to recognize which adaptation modules/module types work well/best with a known, target dataset.

In at least some embodiments of machine learning (ML) processes/algorithms described herein, the ML process/algorithm can include a multi-layer neural network comprising nodes that are trained to have specific weights and biases. In some embodiments, the ML algorithm can employ artificial intelligence techniques or machine learning techniques to analyze data resulting from an application of adaptation modules to trained network data to determine which adaptation modules provide a best adapted network for known, target datasets. The ML process/algorithm can be trained using a plurality of instances of the application of adaptation modules to input trained network data to determine which adaptation modules provide a best adapted network for known, target datasets.

In some embodiments, in accordance with the present principles, suitable machine learning processes/algorithms can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, regression methods, ensemble methods, or neural networks and deep learning such as 'Se2oSeq' Recurrent Neural Network (RNNs)/Long Short Term Memory (LSTM) networks, Convolution Neural Networks (CNNs), graph neural networks applied to the abstract syntax trees corresponding to the sequential program application, and the like. In some embodiments a supervised ML classifier could be used such as, but not limited to, Multi-layer Perceptron, Random Forest, Naive Bayes, Support Vector Machine, Logistic Regression and the like.

In some embodiments in which a target dataset is not known, in a first iteration, the adaptation control system 310 can determine which adaptation modules to turn on or off using historical information regarding which adaptation modules work well in general for determining an adapted network for new datasets. Similar to embodiments in which a target dataset is known, in some embodiments, such information can be stored in the storage device of the present principles, such as the storage device 150 of FIG. 1, which can be accessed by at least an adaptation type selection module and/or the adaptation control system 310 of the present principles. Again, alternatively or in addition, in some embodiments, information regarding which adaptation modules work well in general for determining an adapted network for a new dataset can be input to a cross-domain MAP system of the present principles, such as the cross-domain MAP system 100 of FIG. 1, using an input device of a computing system in communication with a cross-domain MAP system of the present principles, such as the computing device 700 depicted in FIGS. 1 and 7. Alternatively or in addition, in some embodiments in which a new dataset is not known, at least one of an adaptation type selection module of the present principles, such as the adaptation type selection module 110 of FIG. 1 and/or an adaptation control system of the present principles, such as the adaptation control system 310 of FIG. 3, can implement a machine learning process, as described above, to determine information regarding which adaptation modules work well in general for determining an adapted network for new datasets.

In the functional diagram 300 of a cross-domain MAP system of the present principles of FIG. 3, for the adaptation modules that remain on/active, at least one hyperparameter is determined for each of the active adaptation modules. In some embodiments in which a target dataset is known, in a first iteration, the adaptation control system 310 can determine which hyperparameters to assign to each active adaptation module using historical information regarding which hyperparameters work well for each adaptation module for determining an adapted network for the target dataset. In some embodiments, such information can be stored in the storage device 150 of FIG. 1 and can be accessed by at least a hyperparameter selection module and/or the adaptation control system 310 of the present principles. Alternatively or in addition, in some embodiments, information regarding which hyperparameters work well for each adaptation module for determining an adapted network for the known, target dataset can be input to a cross-domain MAP system of the present principles, such as the cross-domain MAP system 100 of FIG. 1, using an input device of a computing system in communication with a cross-domain MAP system of the present principles, such as the computing device 700 depicted in FIGS. 1 and 7. Alternatively or in addition, in some embodiments, at least one of a hyperparameter selection module of the present principles, such as the hyperparameter selection module 120 of FIG. 1 and/or an adaptation control system of the present principles, such as the adaptation control system 310 of FIG. 3, can implement a machine learning process to determine information regarding which hyperparameters work well for each adaptation module for determining an adapted network for a known, target dataset. That is, in some embodiments, a machine learning process can be trained to recognize which hyperparameters work well for each adaptation module for determining an adapted network for the known, target dataset.

In at least some embodiments of machine learning (ML) processes/algorithms described herein, the ML process/algorithm can include a multi-layer neural network comprising nodes that are trained to have specific weights and biases. In some embodiments, the ML algorithm can employ artificial intelligence techniques or machine learning techniques to analyze data resulting from an application of hyperparameters to adaptation modules to determine which hyperparameters work well for each adaptation module for determining an adapted network for a known target dataset. The ML process/algorithm can be trained using a plurality of instances of the application of adaptation modules to input trained network data to determine which hyperparameters work well for each adaptation module for determining an adapted network for the target dataset.

In some embodiments in which a target dataset is not known, in a first iteration, the adaptation control system 310 can determine hyperparameters to apply to each active adaptation module using historical information regarding which hyperparameters work well for each adaptation module for determining an adapted network for a new dataset. Similar to embodiments in which a target dataset is known, in some embodiments, such information can be stored in the storage device of the present principles, such as the storage device 150 of FIG. 1, which can be accessed by at least a hyperparameter selection module and/or the adaptation control system 310 of the present principles. Again, alternatively or in addition, in some embodiments, information regarding which hyperparameters work well for each adaptation module for determining an adapted network for a new dataset, can be input to a cross-domain MAP system of the present principles, such as the cross-domain MAP system 100 of FIG. 1, using an input device of a computing system in communication with a cross-domain MAP system of the present principles, such as the computing device 700 depicted in FIGS. 1 and 7. Alternatively or in addition, in some embodiments in which a new dataset is not known, at least one of a hyperparameter selection module of the present principles, such as hyperparameter selection module 120 of FIG. 1 and/or an adaptation control system of the present principles, such as the adaptation control system 310 of FIG. 3, can implement a machine learning process, as described above, to determine information regarding which hyperparameters work well for each adaptation module for determining an adapted network for new datasets.

In the functional diagram 300 of a cross-domain MAP system of the present principles of FIG. 3, for the adaptation modules that remain on/active, the output of a previous adaptation module becomes an input for a next adaptation module in the pipeline 300. For example, in the functional diagram 300 of the cross-domain MAP system of FIG. 3, the first BatchNorm statistics tuning module 312 receives data from the pretrained network 301 and performs an adaptation process on the received data. The output of the first BatchNorm statistics tuning module 312 can be communicated to the first Prototypical Network module 314 as adapted network data when the first Prototypical Network module 314 remains active. In the embodiment of the functional diagram 300 of the cross-domain MAP system of FIG. 3, the Prototypical Network module 314 performs a protonet adaptation process on the adapted network data from the first BatchNorm statistics tuning module 312. The process continues until a last active adaptation module in the pipeline 305 processes an adapted network output from a previous active adaptation module in the pipeline 305.

In the functional diagram 300 of a cross-domain MAP system of the present principles of FIG. 3, in embodiments in which adaptive learning is being implemented by switching on the adaptive learning module 330 using, for example, the adaptation control system 310, the output of the third Prototypical Network module 328 is communicated to the adaptive learning module 330. The adaptive learning module 330 receives the adapted network data from a previous adaptation module of a pipeline of the present principles, in the functional diagram 300 of FIG. 3, the third Prototypical Network module 328. In a first iteration, the adaptive learning module 330 can apply the received adapted network data (e.g., an adapted pretrained classifier and/or adapted associated embedding space) to the known, target dataset and/or an unknown dataset to classify the data of the dataset to which it is being applied to determine the effectiveness of the adapted network data determined by the cross-domain MAP system of the present principles of FIG. 3. In some embodiments, the information regarding the effectiveness of the adapted network determined by the adaptive learning module 330 can be stored in a storage device accessible by the adaptive learning module 330, such as the storage device 150 of FIG. 1. Alternatively or in addition, the information regarding the effectiveness of the adapted network determined by the adaptive learning module 330 can be communicated to at least one of the adaptation type selection module 110, the hyperparameter selection module 120, or the optional evaluation module 140 of the cross-domain MAP system 100 of FIG. 1 to be used, in some embodiments, for at least assisting in a selection of at least one of an adaptation module type or a hyperparameter in subsequent iterations (described in greater detail below). The functionality of the optional evaluation module 140 of the cross-domain MAP system 100 of FIG. 1 is described below.

Although in the embodiment of the functional diagram 300 of a cross-domain MAP system of the present principles of FIG. 3, the adaptive learning module 330 is applied to an output of the final adaptation module in the pipeline 300 and specifically the third Prototypical Network module 328, in alternate embodiments of the present principles, the functionality of an adaptive learning module of the present principles, such as the adaptive learning module 330 of FIG. 3, can be applied to the output of one or more of other adaptation modules of a pipeline of the present principles, such as the pipeline 300 of FIG. 3.

For subsequent iterations of the functionality of a cross-domain MAP of the present principles, such as described with respect to the functionality diagram 300 of FIG. 3, at least one of the at least two different types of active adaptation modules in the pipeline 305 and/or a respective hyperparameter is changed in the subsequent iteration. For example, in some embodiments, in a subsequent iteration, different ones of the adaptation modules and adaptation module types can be turned on or off in the pipeline 305 and/or different hyperparameters can be selected/determined for at least one of the active adaptation modules and adaptation module types in the pipeline. Alternatively or in addition, in some embodiments, different types of adaptation modules or a different order of the adaptation modules in the pipeline 305 can be determined for determining a new adapted network as described above for this subsequent iteration. As described above with respect to the first iteration, a determination by an adaptation type selection module of the present principles for which adaptation modules, adaptation module types, and order of the adaptation modules to include in a pipeline can be based on at least one of historical performance of adaptation modules, user inputs, or machine learning processes. However, in such subsequent iterations in which an optional adaptive learning module of the present principles is active, an adaptation type selection module of the present principles can further consider information regarding an effectiveness of adapted network/data determined in a previous iteration and determined by, for example, the optional adaptive learning module, to determine which adaptation modules, adaptation module types, and order of the adaptation modules to include in a pipeline of the present principles.

As also described above with respect to the first iteration, a determination by a hyperparameter selection module of the present principles for which hyperparameters to apply to the active adaptation modules and adaptation module types can be based on at least one of historical performance of hyperparameters, user inputs, or machine learning processes. However, in such subsequent iterations in which an optional adaptive learning module of the present principles is active, an hyperparameter selection module of the present principles can further consider information regarding an effectiveness of adapted network/data determined in a previous iteration and determined by, for example, the optional adaptive learning module, to determine which hyperparameters to apply to the active adaptation modules and adaptation module types in a pipeline of the present principles. The adjusted pipeline of the subsequent iteration can then determine a new adapted network/data as described above.

The new determined adapted network of the subsequent iteration from a last active adaptation module of the pipeline can be communicated, as described above in the first iteration, to an optional adaptive learning module of the present principles, such as the adaptive learning module 330 of FIG. 3. The adaptive learning module of the present principles can apply the received new determined adapted network data of the subsequent iteration (e.g., an adapted pretrained classifier and/or adapted associated embedding space) to the known, target dataset and/or an unknown dataset to classify the data of the dataset to which it is being applied to determine the effectiveness of the new determined adapted network data determined by the cross-domain MAP system of the present principles. In some embodiments, the information regarding the effectiveness of the adapted network determined by the adaptive learning module in this subsequent iteration can be stored in a storage device accessible by the adaptive learning network module, such as the storage device 150 of FIG. 1. Alternatively or in addition, the information regarding the effectiveness of the adapted network determined by the adaptive learning module can be communicated to at least one of the adaptation type selection module 110, the hyperparameter selection module 120, or the optional evaluation module 140 of the cross-domain MAP system 100 of FIG. 1 to be used, in some embodiments, for at least assisting in a selection of at least one of an adaptation module type or a hyperparameter in subsequent iterations (described in greater detail below).

As describe above, information determined by an optional adaptive learning module of the present principles, such as the adaptive learning module 330 of FIG. 3, regarding at least the effectiveness of an adapted network determined by a pipeline of a cross-domain MAP system of the present principles can be communicated to an evaluation module of the present principles, such as the evaluation module 140 of the cross-domain MAP system 100 of FIG. 1. Alternatively or in addition, in some embodiments the evaluation module 140 can communicate with a storage device of the present principles, such as the storage device 150 of the cross-domain MAP system 100 of FIG. 1 to access stored information regarding at least the effectiveness of a determined adapted network, pipeline configurations, adaptation modules, adaptation module types, hyperparameters, and the like.

In some embodiments, the evaluation module of the present principles, such as the evaluation module 140 of the cross-domain MAP system 100 of FIG. 1, can use data/information regarding at least the effectiveness of adapted networks, pipeline configurations, adaptation modules, adaptation module types, hyperparameters, and the like to determine at least parameters of a pipeline of the present principles that result in effective adapted networks for known and unknown target datasets. In some embodiments, the evaluation module can implement a machine learning process to learn pipeline configurations (i.e., included adaptation modules, adaptation module types and locations, hyperparameters, etc.) that are effective for specific datasets. That is, in some embodiments, a machine learning process can be trained to recognize which adaptation modules, adaptation module types, locations of the adaptation modules/types, hyperparameters and the like work well in a pipeline for generating an adapted network for known and unknown target datasets. The information determined by the evaluation module 140 can be communicated to at least one of an adaptation type selection module 110, a hyperparameter selection module 120, an optional adaptive learning module 130 and can be stored in a storage device 150 of the present principles. That is in some embodiments, the evaluation module 110 can communicate recommendations to at least one of the adaptation type selection module 110 and the hyperparameter selection module 120 for assisting in configuring a pipeline of the present principles for determining an effective adapted network for a target dataset.

The functionality and effectiveness of a determined adapted network of an embodiment of a cross-domain MAP of the present principles, such as the cross-domain MAP system 100 of FIG. 1, was compared to existing cross-domain few-shot learning benchmarks including the VL3 challenge (minilmageNet to CropDisease, EuroSAT, ISIC and ChestX) and a 4 dataset benchmark from the LFT work (minilmageNet to CUB, Cars, Places, Plantae) herein referred to as the LFT benchmark.

State-of-the-art few-shot learning approaches have seen major benefits from improving the pretrained representations on minilmageNet through improved architectures, episodic meta-training and self-supervised learning. Improvements on minilmageNet representations have been shown to be orthogonal to improvements in fewshot adaptation but are yet to be standardized to provide a level playing field for advancing few-shot adaptation and are disconnected from a larger part of the representation learning community focusing on ImageNet.

To level the playing field for comparison, the inventors introduced a new large-scale 100-way, 1-20 shot ImageNet [DomainNet] cross-domain few-shot learning benchmark. For each adaptation dataset, the top 100 most frequent classes are selected, up to availability. Images were randomly sampled to create [2,5,10,20]-shot adaptation problems with 20 test examples. The process is repeated over 5 random seeds to create 5 splits for each of the N-way, K-shot problem. Accuracy is reported for each (dataset, shot) pair, averaged over the 5 random splits. Following existing few-shot learning works, unlabeled test examples are available for semi-supervised and transductive learning.

For each backbone, a focus was on adaptation from standard backbones. For VL3 a ResNet-10 variant pretrained was used on minilmageNet. For LFT a ResNet-10 variant pretrained on minilmageNet was used. For the dataset of the present principles, an EfficientNet-B0 pretrained on ImageNet was used. Input image resolutions are a×a, b×b, c×c. Images are resized to input resolution and the aspect ratio is not preserved.

With reference back to FIG. 2, the full MAP 200 of the present principles is compared to 1) FT: only batchnorm tuning and finetuning modules enabled and 2) PN: only batchnorm tuning and semi-supervised ProtoNet modules enabled. Due of the diversity of downstream datasets, one set of hyperparameters is insufficient to cover them all. As such, for a first experimental implementation, hyperparameters are determined through 3-split cross validation on the adaptation set with a sufficiently large search space. Cross validation splits are sampled by first sampling 1 example per class for adaptation, then dividing the remaining examples into 50% training and 50% testing. In another implementation, to study the effectiveness of the hyperparemeter transfer protocol of the present principles, a comparison is made from 1) scratch: searching MAPs from scratch using hyperopt for 500 rounds; 2) transfer: selecting from the best MAPs searched on all the remaining datasets for [1,2,5,10]-shots. In another implementation, a study is performed on oracle: finding the best MAP on the adaptation/test sets directly using 500 rounds of hyperparameter search as an upperbound.

Because hyperparameter search from scratch is compute intensive and can take 2-30 days to complete on a single GPU depending on dataset size, to reduce compute time, hyperparameters searched on the first split were used for the remaining splits. In addition, for 1-shot evaluation in LFT where there isn't enough examples for cross-validation, the hyperparameters were manually set and the same set of hyperparameters is used across all datasets.

FIG. 4 depicts a Table of results of the comparison of a MAP of the present principles, such as the MAP 200 of FIG. 2 against the PN 240 and FT 260 pipelines of FIG. 2 and using a hyperparameter search in accordance with the present principles. As depicted in the Table of FIG. 4, a MAP of the present principles significantly improves performance for <10 shot adaptation scenarios. More specifically, as depicted in the Table of FIG. 4, the MAP of the present principles significantly outperforms both PN and FT at 2,5,10-shot by 4%, 3% and 1% respectively, averaged across all datasets. For most datasets, the MAP of the present principles performs better than the best of PN and FT. The Table of FIG. 4 further, confirms the existence of a class of effective hybrid PN-FT adaptation approaches for cross-domain few-shot learning. That is, the Table of FIG. 3 depicts that while FT is a consistent performer in cross-domain few-shot learning, FT could still be complemented by prototype-based methods. As further depicted in the Table of FIG. 4, the gains from the MAP of the present principles tend to be larger for large domain shifts.

FIG. 5 depicts a Table of the results of a comparison of hyperparameter selection strategies for a MAP of the present principles, such as the MAP of FIG. 2 against PN and FT at 2, 5, 10, and 20 shots by their average accuracy across all datasets. Comparing the MAP of the present principles vs FT and PN across oracle hyperparameters, it is evident from the Table of FIG. 5 that the MAP of the present principles creates 4%, 3% and 1% theoretical performance headroom for further performance improvements. The headroom has been fulfilled almost from-scratch and transfer hyperparameter search strategies. The vast number of additional hyperparameters introduced by the MAP of the present principles did not bring any meta-overfitting side effect. This suggests that better adaptation methods can include more modules to a MAP of the present principles, such as domain-specific modules, without worrying about meta-overfitting.

From the comparisons in the Table of FIG. 5 between a from-scratch hyperparameter search strategy and the transfer hyperparameter search strategy of the present principles, it becomes evident that the transfer hyperparameter search strategy of the present principles performs equally as well as the from-scratch hyperparameter search or even oracle on Full and FT adaptations despite using 20× less budget during adaptation.

Figure 6:
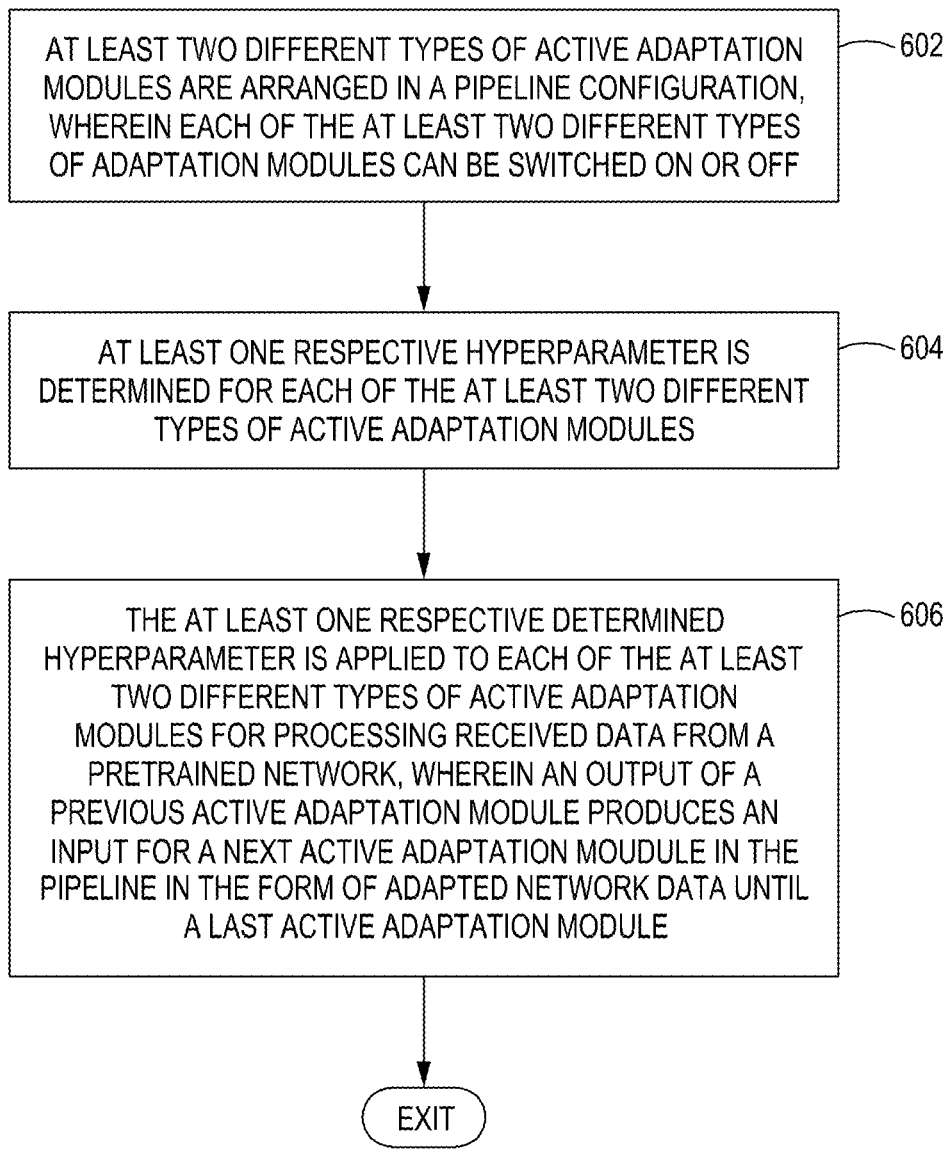
FIG. 6 depicts a flow diagram of a method for adapting pre-trained networks to different datasets in accordance with an embodiment of the present principles.

FIG. 6 depicts a flow diagram of a method 600 for adapting pre-trained networks to different datasets in accordance with an embodiment of the present principles. The method 600 can begin at 602 during which at least two different types of active adaptation modules are arranged in a pipeline configuration, wherein each of the at least two different types of adaptation modules can be switched on or off. The method 600 can proceed to 604.

At 604, at least one respective hyperparameter is determined for each of the at least two different types of active adaptation modules. The method 600 can proceed to 606.

At 606, the at least one respective determined hyperparameter is applied to each of the at least two different types of active adaptation modules for processing received data from a pretrained network, wherein an output of a previous active adaptation module produces an input for a next active adaptation module in the pipeline in the form of adapted network data until a last active adaptation module. The method 600 can be exited.

In some embodiments, the method can further include applying an adaptive learning process to an output of at least one of the at least two different types of active adaptation modules.

As depicted in FIG. 1, embodiments of a cross-domain MAP system of the present principles, such as the cross-domain MAP system 100 of FIG. 1, can be implemented in a computing device 700 in accordance with the present principles. That is, in some embodiments, pretrained network data and the like can be communicated to components of the cross-domain MAP system 100 of FIG. 1 using the computing device 700 via, for example, any input/output device associated with the computing device 700. Data associated with a cross-domain MAP system in accordance with the present principles can be presented to a user using an output device of the computing device 700, such as a display, a printer or any other form of output device.

Figure 7:
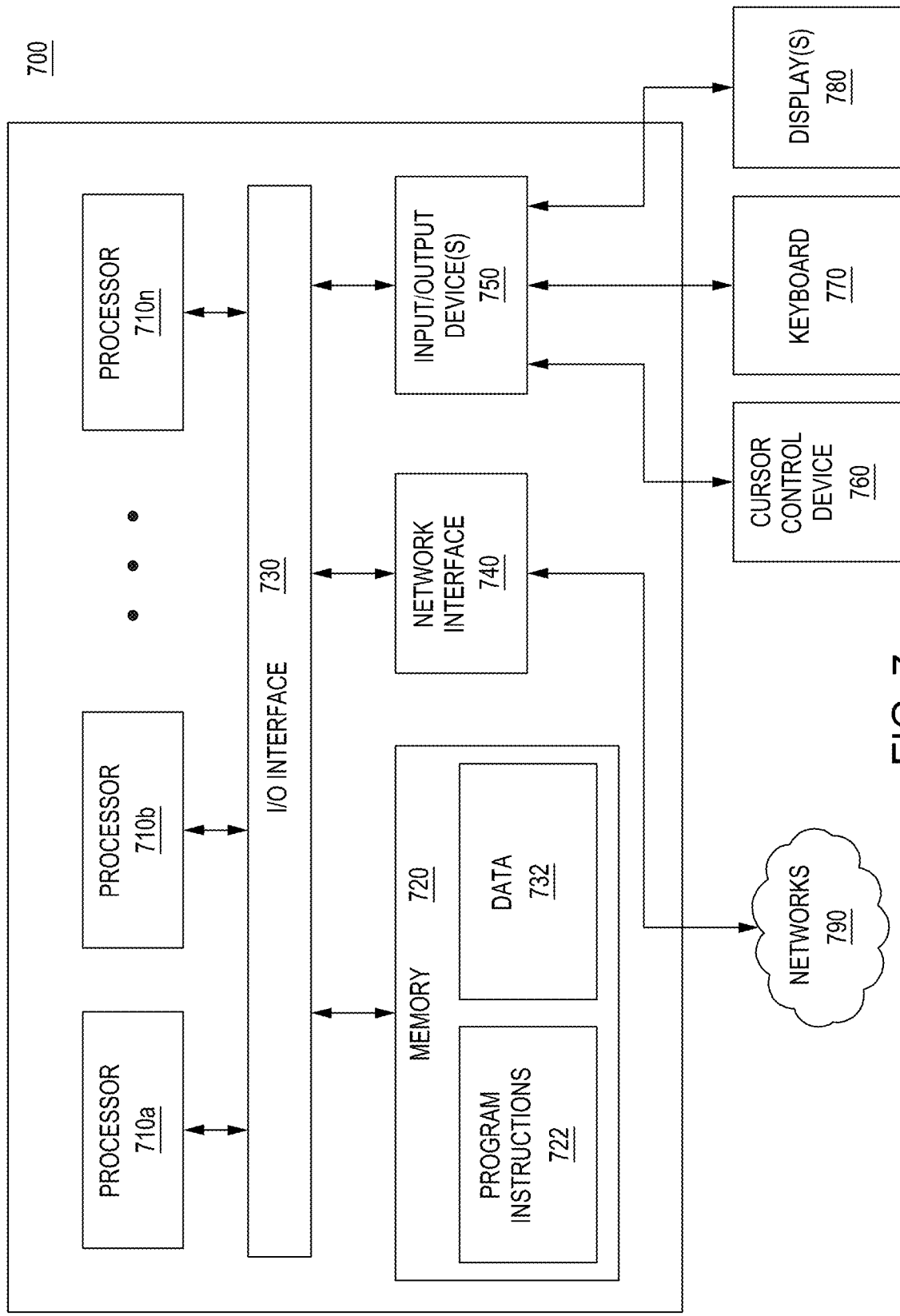
FIG. 7 depicts a high-level block diagram of a computing device suitable for use with embodiments of a cross-domain modular adaptation system in accordance with an embodiment of the present principles.

For example, FIG. 7 depicts a high-level block diagram of a computing device 700 suitable for use with embodiments of a pose estimation/navigation augmentation system in accordance with the present principles such as the navigation augmentation system 100 of FIG. 1. In some embodiments, the computing device 700 can be configured to implement methods of the present principles as processor-executable executable program instructions 722 (e.g., program instructions executable by processor(s) 810) in various embodiments.

In the embodiment of FIG. 7, the computing device 700 includes one or more processors 710a-710n coupled to a system memory 720 via an input/output (I/O) interface 730. The computing device 700 further includes a network interface 740 coupled to I/O interface 730, and one or more input/output devices 750, such as cursor control device 760, keyboard 770, and display(s) 780. In various embodiments, a user interface can be generated and displayed on display 780. In some cases, it is contemplated that embodiments can be implemented using a single instance of computing device 700, while in other embodiments multiple such systems, or multiple nodes making up the computing device 700, can be configured to host different portions or instances of various embodiments. For example, in one embodiment some elements can be implemented via one or more nodes of the computing device 700 that are distinct from those nodes implementing other elements. In another example, multiple nodes may implement the computing device 700 in a distributed manner.

In different embodiments, the computing device 700 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 700 can be a uniprocessor system including one processor 710, or a multiprocessor system including several processors 710 (e.g., two, four, eight, or another suitable number). Processors 710 can be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 can be configured to store program instructions 722 and/or data 732 accessible by processor 710. In various embodiments, system memory 720 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 720. In other embodiments, program instructions and/or data can be received, sent or stored upon different types of computer-accessible media or on similar media separate from system memory 720 or computing device 700.

In one embodiment, I/O interface 730 can be configured to coordinate I/O traffic between processor 710, system memory 720, and any peripheral devices in the device, including network interface 740 or other peripheral interfaces, such as input/output devices 750. In some embodiments, I/O interface 730 can perform any necessary protocol, timing or other data transformations to convert data signals from one component (e.g., system memory 720) into a format suitable for use by another component (e.g., processor 710). In some embodiments, I/O interface 730 can include support for devices attached through various types of peripheral buses, such as a variant of the Peripheral Component Interconnect (PCI) bus standard or the Universal Serial Bus (USB) standard, for example. In some embodiments, the function of I/O interface 730 can be split into two or more separate components, such as a north bridge and a south bridge, for example. Also, in some embodiments some or all of the functionality of I/O interface 730, such as an interface to system memory 720, can be incorporated directly into processor 710.

Network interface 740 can be configured to allow data to be exchanged between the computing device 700 and other devices attached to a network (e.g., network 790), such as one or more external systems or between nodes of the computing device 700. In various embodiments, network 790 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 750 can, in some embodiments, include one or more display terminals, keyboards, keypads, touchpads, scanning devices, voice or optical recognition devices, or any other devices suitable for entering or accessing data by one or more computer systems. Multiple input/output devices 750 can be present in computer system or can be distributed on various nodes of the computing device 700. In some embodiments, similar input/output devices can be separate from the computing device 700 and can interact with one or more nodes of the computing device 700 through a wired or wireless connection, such as over network interface 740.

Those skilled in the art will appreciate that the computing device 700 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 700 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 700 can communicate with other computing devices based on various computer communication protocols such a Wi-Fi, Bluetooth.R™. (and/or other standards for exchanging data over short distances includes protocols using short-wavelength radio transmissions), USB, Ethernet, cellular, an ultrasonic local area communication protocol, etc. The computing device 600 can further include a web browser.

Although the computing device 700 is depicted as a general-purpose computer, the computing device 700 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 8:
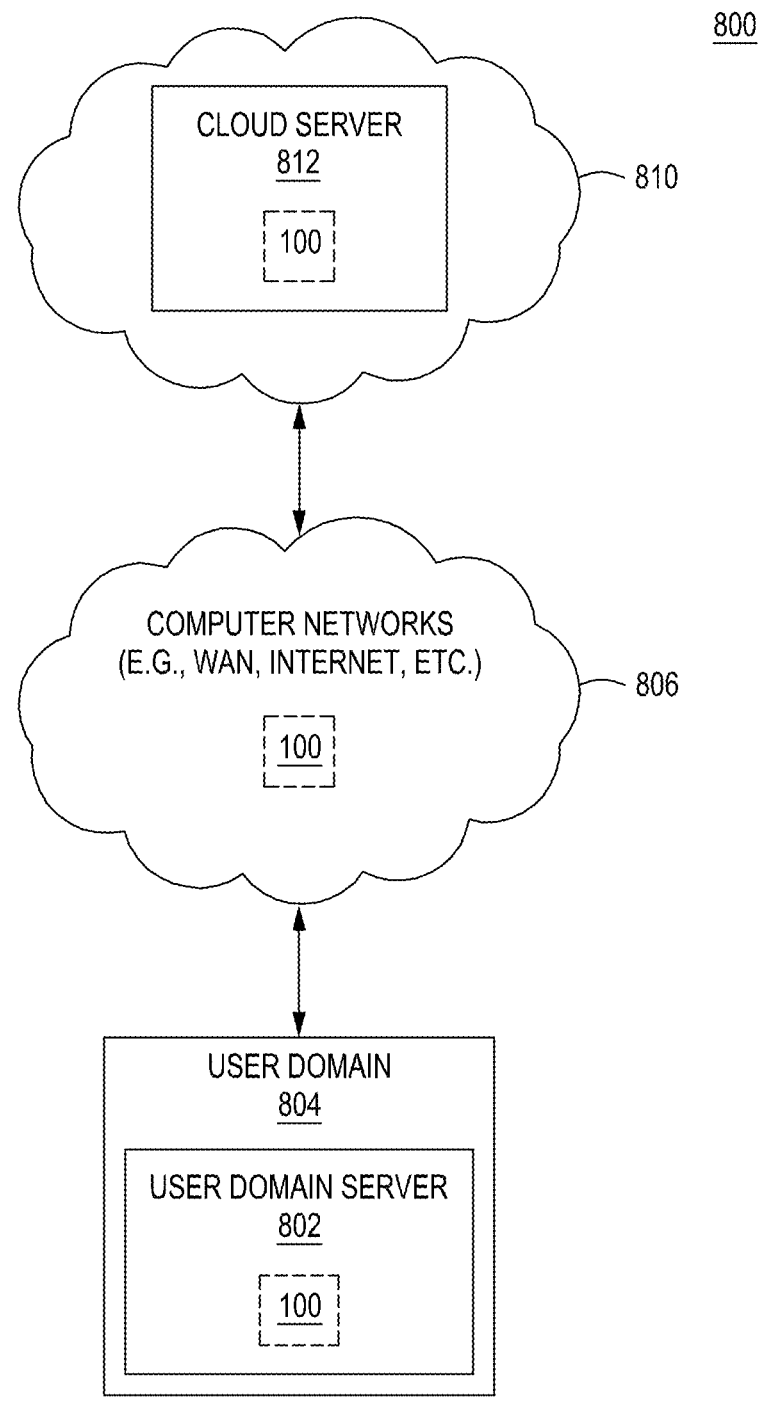
FIG. 8 depicts a high-level block diagram of a network in which embodiments of a cross-domain modular adaptation system in accordance with the present principles, can be applied.

FIG. 8 depicts a high-level block diagram of a network in which embodiments of a cross-domain MAP system in accordance with the present principles, such as the cross-domain MAP system 100 of FIG. 1, can be applied. The network environment 800 of FIG. 8 illustratively comprises a user domain 802 including a user domain server/computing device 804. The network environment 800 of FIG. 8 further comprises computer networks 806, and a cloud environment 810 including a cloud server/computing device 812.

In the network environment 800 of FIG. 8, a system for adapting pre-trained networks to different datasets in accordance with the present principles, such as the cross-domain MAP system 100 of FIG. 1, can be included in at least one of the user domain server/computing device 804, the computer networks 806, and the cloud server/computing device 812. That is, in some embodiments, a user can use a local server/computing device (e.g., the user domain server/computing device 804) to provide an adapted network/classifier and embedding information, which can be used for adapting pre-trained networks to different datasets in accordance with the present principles.

In some embodiments, a user can implement a cross-domain MAP system of the present principles for adapting pre-trained networks to different datasets in the computer networks 806. Alternatively or in addition, in some embodiments, a user can implement a cross-domain MAP system of the present principles for adapting pre-trained networks to different datasets in the cloud server/computing device 812 of the cloud environment 810. For example, in some embodiments it can be advantageous to perform processing functions of the present principles in the cloud environment 810 to take advantage of the processing capabilities and storage capabilities of the cloud environment 810. In some embodiments in accordance with the present principles, a system for adapting pre-trained networks to different datasets in accordance with the present principles can be located in a single and/or multiple locations/servers/computers to perform all or portions of the herein described functionalities of a system in accordance with the present principles. For example, in some embodiments some components of a cross-domain MAP system of the present principles can be located in one or more than one of the a user domain 802, the computer network environment 806, and the cloud environment 810 while other components of the present principles can be located in at least one of the user domain 802, the computer network environment 806, and the cloud environment 810 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 700 can be transmitted to the computing device 700 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for adapting a pre-trained network for application to a different dataset, comprising:
    arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off;
    determining at least one respective hyperparameter for each of the at least two different types of active adaptation modules; and
    applying the at least one respective determined hyperparameter to each of the at least two different types of active adaptation modules for processing received data from the pretrained network to determine an adapted network.

2. The method of claim 1, further comprising:
    applying an adaptive learning process to an output of at least one of the at least two different types of active adaptation modules.

3. The method of claim 1, wherein the arranging, the determining and the applying comprise an iterative process in which at least one of the at least two different types of active adaptation modules in the pipeline or a respective hyperparameter is changed in each subsequent iteration.

4. The method of claim 1, wherein at least one of the at least two different types of the active adaptation modules or the respective hyperparameters are selected from a collection of historically well-functioning adaptation modules or hyperparameters stored in a storage device.

5. The method of claim 1, wherein at least one of the at least two different types of the active adaptation modules or the respective hyperparameters are selected based on at least one a user input or an input from a machine learning process.

6. The method of claim 5, wherein the machine learning process is trained to determine at least one of an adaptation module for the pipeline or a hyperparameter for an adaptation module based on a target dataset.

7. The method of claim 1, wherein data from the pre-trained network comprises at least one of classification data or data regarding an embedding space.

8. A non-transitory machine-readable medium having stored thereon at least one program, the at least one program including instructions which, when executed by a processor, cause the processor to perform a method in a processor based system for adapting a pre-trained network for application to a different dataset, comprising:
    arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off;
    determining at least one respective hyperparameter for each of the at least two different types of active adaptation modules; and
    applying the at least one respective determined hyperparameter to each of the at least two different types of active adaptation modules for processing received data from the pretrained network to determine an adapted network.

9. The non-transitory machine-readable medium of claim 8, further comprising:
applying an adaptive learning process to an output of at least one of the at least two different types of active adaptation modules.

10. The non-transitory machine-readable medium of claim 8, in which the arranging, the determining and the applying steps comprise an iterative process in which at least one of an order of the at least two different types of active adaptation modules in the pipeline or a respective hyperparameter is changed in each subsequent iteration.

11. The non-transitory machine-readable medium of claim 8, wherein at least one of the at least two different types of the active adaptation modules or the respective hyperparameters are selected from a collection of historically well-functioning adaptation modules or hyperparameters stored in a storage device.

12. The non-transitory machine-readable medium of claim 8, wherein at least one of the at least two different types of the active adaptation modules or the respective hyperparameters are selected based on at least one a user input or an input from a machine learning process.

13. The non-transitory machine-readable medium of claim 12, wherein the machine learning process is trained to determine at least one of an adaptation module for the pipeline or a hyperparameter for an adaptation module based on a target dataset.

14. The non-transitory machine-readable medium of claim 8, wherein data from the pre-trained network comprises at least one of classification data or data regarding an embedding space.

15. A system for adapting a pre-trained network for application to a different dataset, comprising:
a storage device; and
a computing device comprising a processor and a memory having stored therein at least one program, the at least one program including instructions which, when executed by the processor, cause the computing device to perform a method, comprising:
arranging at least two different types of active adaptation modules in a pipeline configuration, wherein an output of a previous active adaptation module produces an input for a next active adaptation module in the pipeline in the form of adapted network data until a last active adaptation module, and wherein each of the at least two different types of adaptation modules can be switched on or off;
determining at least one respective hyperparameter for each of the at least two different types of active adaptation modules; and
applying the at least one respective determined hyperparameter to each of the at least two different types of active adaptation modules for processing received data from the pretrained network to determine an adapted network.

16. The system of claim 15, further comprising:
applying an adaptive learning process to an output of at least one of the at least two different types of active adaptation modules.

17. The system of claim 15, in which the arranging, the determining and the applying steps comprise an iterative process in which at least one of an order of the at least two different types of active adaptation modules in the pipeline or a respective hyperparameter is changed in each subsequent iteration.

18. The system of claim 15, wherein at least one of the at least two different types of the active adaptation modules or the respective hyperparameters are selected from a collection of historically well-functioning adaptation modules or hyperparameters stored in the storage device.

19. The system of claim 15, wherein at least one of the at least two different types of the active adaptation modules or the respective hyperparameters are selected based on at least one a user input or an input from a machine learning process.

20. The method of claim 19, wherein the machine learning process is trained to determine at least one of an adaptation module for the pipeline or a hyperparameter for an adaptation module based on a known target dataset.

* * * * *